United States Patent [19]
Jinnai

[11] Patent Number: 5,982,502
[45] Date of Patent: *Nov. 9, 1999

[54] IMAGE PROCESSING APPARATUS

[75] Inventor: Shigeru Jinnai, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/542,043

[22] Filed: Oct. 12, 1995

[30] Foreign Application Priority Data

Oct. 19, 1994 [JP] Japan ................................ 6-253265

[51] Int. Cl.$^6$ ................................................. H04N 1/40
[52] U.S. Cl. ......................... 358/296; 358/404; 358/444; 395/116
[58] Field of Search ................... 358/296, 401, 358/404, 440, 444, 526, 402, 403, 434–439; 395/115, 116; 399/42–44

[56] References Cited

U.S. PATENT DOCUMENTS

| | | | |
|---|---|---|---|
| Re. 34,429 | 11/1993 | Baran | 379/100 |
| 5,051,779 | 9/1991 | Hikawa | 355/200 |
| 5,099,340 | 3/1992 | Kamada et al. | 358/440 |
| 5,235,655 | 8/1993 | Hikawa | 382/61 |
| 5,267,303 | 11/1993 | Johnson et al. | 358/436 |
| 5,282,052 | 1/1994 | Johnson et al. | 358/440 |
| 5,313,572 | 5/1994 | Yamamoto et al. | 382/47 |
| 5,371,574 | 12/1994 | Ohmura et al. | 358/468 |
| 5,448,375 | 9/1995 | Cooper et al. | 358/444 |
| 5,465,167 | 11/1995 | Cooper et al. | 358/402 |
| 5,539,427 | 7/1996 | Bricklin et al. | 345/118 |
| 5,563,986 | 10/1996 | Suzuki | 395/115 |
| 5,564,033 | 10/1996 | Takekuma et al. | 395/442 |
| 5,625,770 | 4/1997 | Nomura | 358/403 |
| 5,680,223 | 10/1997 | Cooper et al. | 358/403 |
| 5,745,610 | 4/1998 | Johnson | 382/309 |
| 5,754,308 | 5/1998 | Lopresti et al. | 358/403 |

FOREIGN PATENT DOCUMENTS

| | | | |
|---|---|---|---|
| 0398184A3 | 11/1990 | European Pat. Off. | H04N 1/32 |
| 0461671A2 | 12/1991 | European Pat. Off. | H04N 1/32 |

*Primary Examiner*—Adolf Deneke Berhane
*Assistant Examiner*—Gregory J. Toatley, Jr.
*Attorney, Agent, or Firm*—Fitzpatrick, Cella, Harper & Scinto

[57] ABSTRACT

An image processing apparatus of a facsimile includes an input unit such as an image reader which reads and inputs image data from originals, a memory unit which stores the input image data in a memory medium such as a magnetooptical disk, and an output unit which outputs a sheet for searching the image data stored in the memory medium. The output unit outputs a sheet on which information to specify the image data stored in the memory unit and a marking area to designate a destination are added when the image data is transmitted. The memory unit stores the image data of a plurality of pages as one file into the memory unit. The output unit also outputs a sheet to which are added information to specify the file and a marking area to designate the telephone number of the destination.

26 Claims, 10 Drawing Sheets

| CODE |
|---|

E3 {
 DISK NAME : PATENT DISK  — E1
 DOCUMENT  : MULTIPLEX
 NAME        APPARATUS
 DOCUMENT No. : 1234567
 INDEX 3 :
 INDEX 4 :
}

E4 {
 MAKING DATE : 1993-12-01
 RENEWAL DATE : 1993-12-25
 PAGES : 30
}

ONE-PAGE REDUCTION IMAGE — E2

E5 ☐ SORT    ☐ STAPLE  ☐ DOUBLE SIDES

THE NUMBER — E6
100 10 1

☐ 4in1    ☐ 9in1    ☐ 16in1      0 ☐☐☐
E9 ☐ ADDITIONAL RECORDING  ☐ COPY   1 ☐☐☐
                                    2 ☐☐☐
E7 ☐ FAX                            3 ☐☐☐
                                    4 ☐☐☐
   ☐ NORMAL    ☐ FINE               5 ☐☐☐
   ☐ SUPER FINE ☐ ULTRA FINE        6 ☐☐☐
                                    7 ☐☐☐
                                    8 ☐☐☐
                                    9 ☐☐☐

E8 TEL No.
 0 ☐☐☐☐☐☐☐☐☐☐☐☐☐
 1 ☐☐☐☐☐☐☐☐☐☐☐☐☐
 2 ☐☐☐☐☐☐☐☐☐☐☐☐☐
 3 ☐☐☐☐☐☐☐☐☐☐☐☐☐
 4 ☐☐☐☐☐☐☐☐☐☐☐☐☐
 5 ☐☐☐☐☐☐☐☐☐☐☐☐☐
 6 ☐☐☐☐☐☐☐☐☐☐☐☐☐
 7 ☐☐☐☐☐☐☐☐☐☐☐☐☐
 8 ☐☐☐☐☐☐☐☐☐☐☐☐☐
 9 ☐☐☐☐☐☐☐☐☐☐☐☐☐

IMAGE PROCESSING APPARATUS

BACKGROUND OF THE INVENTION

1. Field of the Invention

The present invention relates to an image processing apparatus for processing image data and, more particularly, to an image processing apparatus for enabling image data stored in a memory medium to be easily searched.

2. Related Background Art

Hitherto, in an apparatus of such type, for example, a digital copying apparatus, an apparatus having a function for storing a read original image as a file into a memory medium is known. As mentioned above, the image stored in the memory medium is searched and read out by predetermined operations and recorded and outputted.

In this case, there is a case where a search sheet such as a mark sheet or the like is used for searching the image stored in the memory medium. As disclosed in U.S. patent application Ser. No. 08/061,743 filed on May 17, 1993, a mark sheet on which an index of files stored in the memory medium has been recorded is outputted by a predetermined operation, a marking is executed to select a desired file and, after that, the mark sheet is read out by a reader.

Thus, the desired file is searched from the plurality of files stored in the memory medium and is printed out.

In case of searching the image by using the mark sheet and outputting as mentioned above, however additional, work for outputting the mark sheet to which the index has been recorded and, further, marking to select the file are necessary each output time.

There is also a problem such that an output format of the file cannot be designated in this instance.

SUMMARY OF THE INVENTION

An object of the invention is to provide an image processing apparatus which can solve the above-mentioned problems.

Another object of the invention is to provide an image processing apparatus which can search a desired file by a simple operation.

Still another object of the invention is to provide an image processing apparatus which can output image data of a file stored in a memory medium in a desired output mode.

Further another object of the invention is to provide an image processing apparatus in which after an image is stored into a memory medium, a mark sheet for searching the image is easily outputted.

The above and other objects and features of the present invention will become apparent from the following detailed description and the appended claims with reference to the accompanying drawings.

DETAILED DESCRIPTION OF THE PREFERRED EMBODIMENTS

An embodiment of the invention is described hereinbelow with reference to the drawings.

Figure 1:
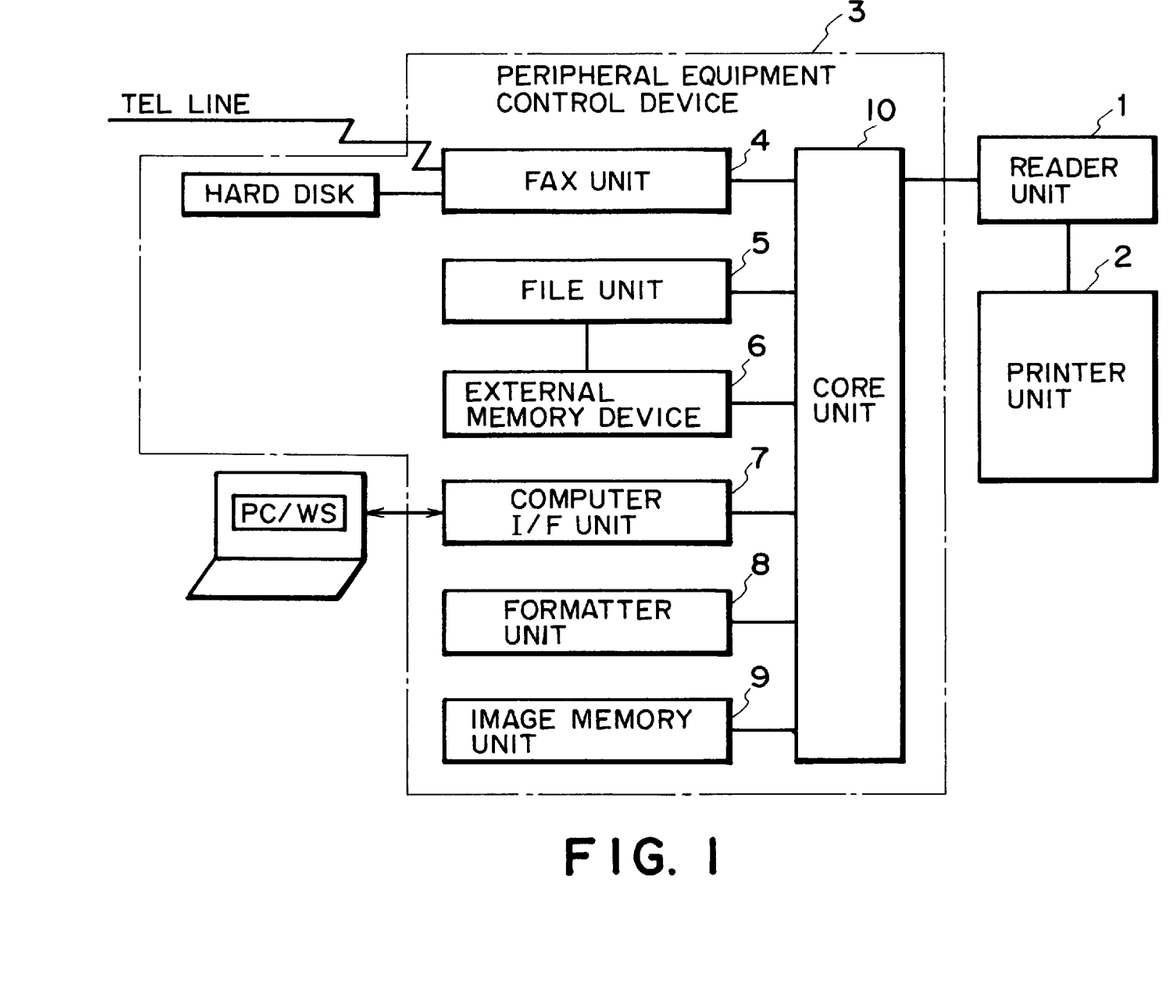
FIG. 1 is a block diagram for explaining a construction of a multiplex image forming apparatus showing an embodiment of the invention.

FIG. 1 is a block diagram for explaining a construction of a multiplex image forming apparatus in which a plurality of functions are multiplexed and showing an embodiment of the invention.

In the diagram, reference numeral 1 denotes an image input device (hereinlater, referred to as a reader unit) for reading out an original image and converting the image to image data; 2 an image output device (hereinafter, referred to as a printer unit) which has a plurality of kinds of recording paper cassettes and records and outputs the image data as a visible image onto a recording paper by a print command; and 3 a peripheral equipment control device which is electrically connected to the reader unit 1 and has various functions. The peripheral equipment control device 3 includes: a facsimile unit 4 for performing a facsimile communication; a file unit 5 for storing the image data as a file and for searching a stored file; an external memory device 6 connected to the file unit 5; a computer interface unit 7 for connecting with an external computer; a formatter unit 8 for forming a visible image from information sent from the external computer; an image memory unit 9 for accumulating information from the reader unit 1 and for temporarily accumulating information sent from the external computer; a core unit 10 for controlling functions of the above-mentioned units 1 to 9.

The facsimile unit 4 includes a CPU (not shown), a RAM (including a dual-port RAM, not shown), and the like and also includes a communication control circuit for executing a facsimile communication process on the basis of a control instruction from the core unit 10, an NCU, a modem, and the like. The facsimile unit 4 executes a communicating process of the G3 standard in parallel together with other function processes. As an option, a hard disk (HD) for storing received information can be connected to the facsimile unit 4. Further, the facsimile unit 4 and core unit 10 can communicate through a connector (not shown).

The file unit 5 includes a CPU (not shown), a RAM (including a dual-port RAM, not shown) and the like and also includes an expansion circuit, a compression circuit, a variable magnification circuit, an SCSI controller, and the like for registering original image information as a file to a memory medium such as a magnetooptical disk or the like inserted to the external memory device 6 and for searching the registered original image information in accordance with a search instruction. A DMA controller controls access to the RAM. The file unit 5 and core unit 10 can communicate through a connector (not shown). The magnetooptical disk set in the external memory device 6 is a detachable memory medium which stores a plurality of files.

Figure 2:
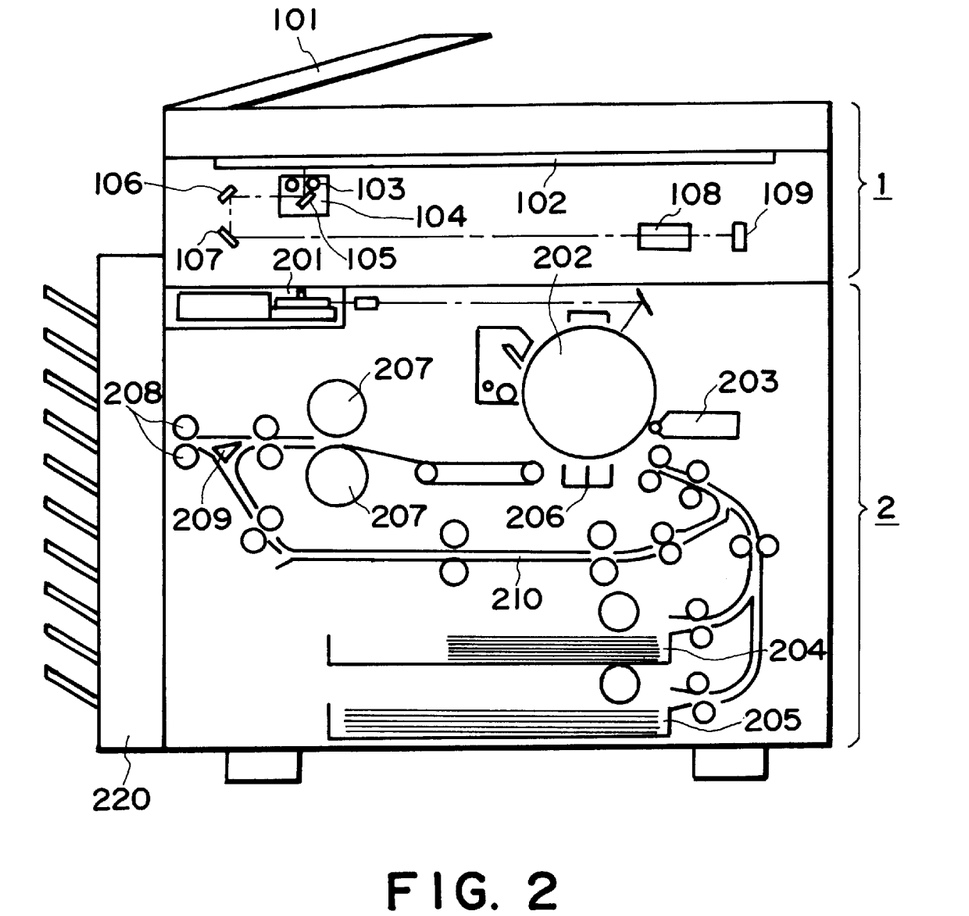
FIG. 2 is a cross sectional view showing a construction of a reader unit and a printer unit shown in FIG. 1.

FIG. 2 is a cross sectional view showing a construction of the reader unit 1 and printer unit 2 shown in FIG. 1. The construction and operation is described hereinbelow.

Originals put on an original supporting base plate of a document feeder 101 are sequentially conveyed one by one onto an original supporting glass plate 102. When the original is conveyed, a lamp 103 of a scanner unit 104 is turned on and the original is exposed and scanned while moving the scanner unit 104. A reflection light from the original is sequentially reflected by mirrors 105, 106, and 107 and passes through a lens 108 and, after that, an image is formed on a CCD image sensor unit 109 (hereinafter, referred to as a CCD) having a color separating function.

Figure 3:
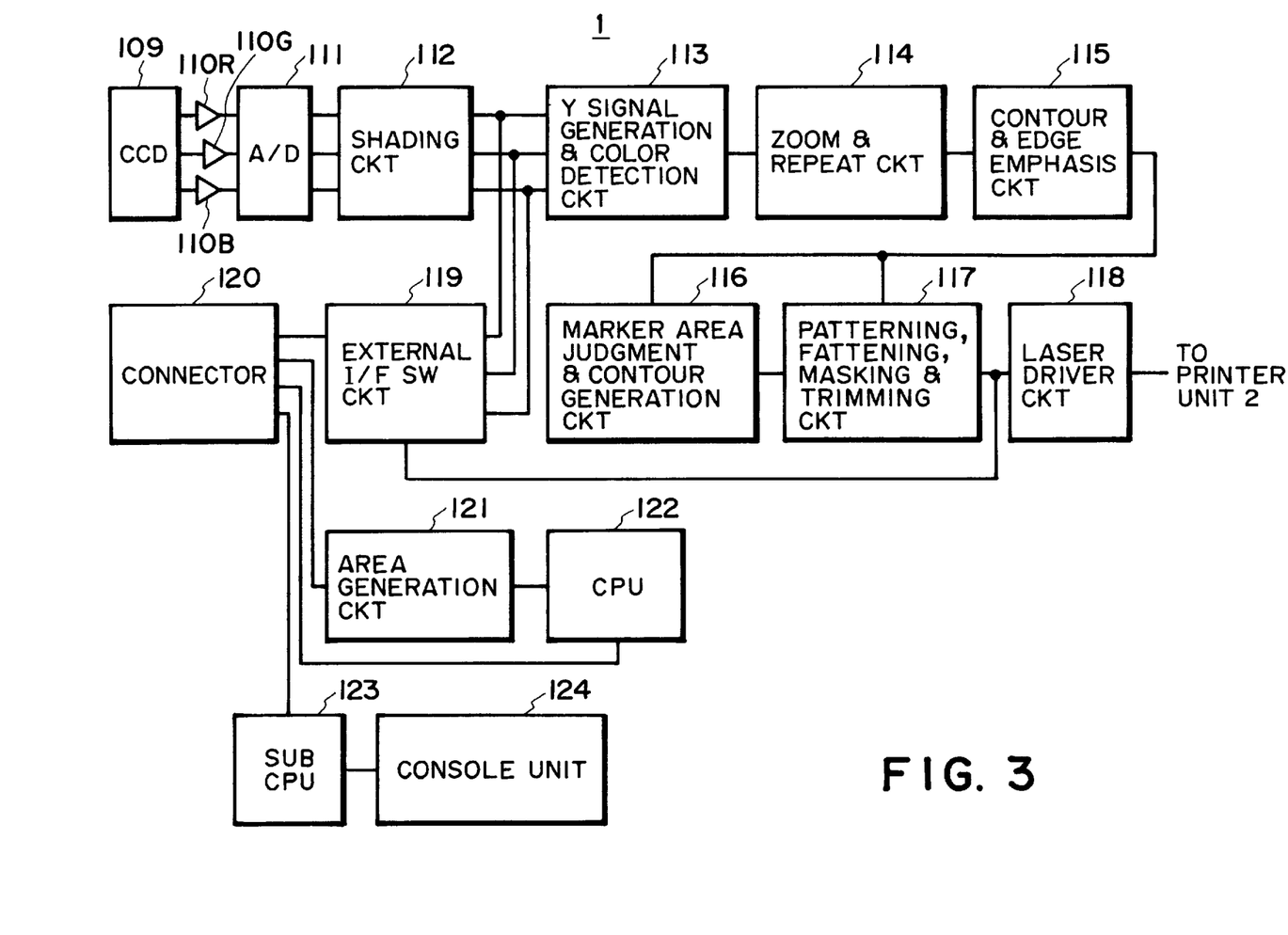
FIG. 3 is a circuit block diagram showing a signal processing construction of the reader unit 1 shown in FIG. 2.

FIG. 3 is a circuit block diagram showing a signal processing construction of the reader unit 1 shown in FIG. 2. The construction and operation is described hereinbelow.

The reflection light (image information) inputted to the CCD 109 is photoelectrically converted to electric signals of red, green, and blue colors. Analog color image information from the CCD 109 is amplified by amplifiers 110R, 110G, and 110B in accordance with input signal levels of an A/D converter 111. Output signals (digital color image information) from the A/D converter 111 are supplied to a shading circuit 112, by which a light distribution variation of the lamp 103 and a sensitivity variation of the CCD are corrected. Signals from the shading circuit 112 are supplied to a Y signal generation and color detection circuit 113 and an external interface switching circuit 119. The Y signal generation and color detection circuit 113 obtains a (Y) signal (luminance signal) by calculating the signals from the shading circuit 112 on the basis of the following equation (1).

$$Y=0.3R+0.6G+0.1B \qquad (1)$$

Further, the apparatus has a color detection circuit for separating three colors into seven colors from the R, G, and B signals and for outputting signals corresponding to the seven colors. An output signal from the Y signal generation and color detection circuit 113 is supplied to a zoom/repeat circuit 114. A zooming (variable magnifying) process in the subscanning direction is performed by a change in scanning speed of the scanner unit 104 and the zooming process in the main scanning direction is performed by the zoom/repeat circuit 114. A plurality of same images can be outputted by the zoom/repeat circuit 114. A contour/edge emphasizing circuit 115 obtains edge emphasized and contour information by emphasizing high frequency components of a signal from the zoom/repeat circuit. A signal from the contour/edge emphasizing circuit 115 is supplied to a marker area judgment and contour generation circuit 116 and a patterning, fattening, masking, and trimming circuit 117. The marker area judgment and contour generation circuit 116 reads out portions written by a marker pen of a designated color on the original and generates contour information of the read marker. The patterning, fattening, masking, and trimming circuit 117 executes processes such as fattening, masking, and trimming to the contour information and also executes a patterning of the color image on the basis of the color detection signal from the Y signal generation and color detection circuit 113. An output signal from the patterning, fattening, masking, and trimming circuit 117 is supplied to a laser driver circuit 118 and the signal subjected to the various processes is converted to a signal for driving a laser. A signal of the laser driver circuit 118 is supplied to the printer unit 2, by which a visible image is formed.

The external interface switching circuit 119 for interfacing with the peripheral equipment control device will now be described.

When the image information is outputted from the reader unit 1 to the peripheral equipment control device 3, the external interface switching circuit 119 outputs the image information from the patterning, fattening, masking, and trimming circuit 117 to a connector 120. When the image information from the peripheral equipment control device 3 is inputted to the reader unit 1, the external interface switching circuit 119 supplies the image information from the connector 120 to the Y signal generation and color detection circuit 113.

Each of the above image information is processed by an instruction of a CPU circuit unit (CPU) 122. An area generation circuit 121 generates various timing signals necessary for the above image processes from values set by the CPU circuit unit 122. A communication with the peripheral equipment control device 3 is executed by using a communicating function provided in the CPU circuit unit 122. A sub-CPU 123 controls a console unit 124 and communicates with the peripheral equipment control device 3 by using a communicating function provided in the sub-CPU 123.

A construction and the operation of the printer unit 2 is described hereinbelow with reference to FIG. 2.

An image signal supplied to the printer unit 2 is inputted to an exposure control unit 201 and is converted to a photosignal. A photosensitive material 202 is irradiated in accordance with the image signal. A latent image formed on the photosensitive material 202 by the irradiation light is developed by a developing unit 203. A transfer paper is conveyed from a transfer paper mounting unit 204 or 205 at a timing matched with a timing of the formation of the latent image and the developed image is transferred by a transfer unit 206. The transferred image is fixed onto the transfer paper by a fixing unit 207. After that, the paper is ejected to the outside of the apparatus by a paper ejecting unit 208. When a sorting function is selected, the transfer paper ejected from the paper ejecting unit 208 is sorted to each bin by a sorter 220. When the sorting function is not selected, the transfer paper is ejected to the top bin of the sorter.

A method of outputting images which were sequentially read onto double sides of one sheet of output paper will now be described. The output paper on which the image was fixed by the fixing unit 207 is once conveyed to the paper ejecting unit 208. After that, a roller is reversely rotated, the conveying direction of the paper is reversed, thereby conveying the paper to a re-feed transfer paper stacking unit 210 through a conveying direction switching member 209. When the next original is prepared, although the original image is read out in a manner similar to the above processes, since the transfer paper is fed from the re-feed transfer paper stacking unit 210, the original images of a total of two sheets can be consecutively formed on the front and back surfaces of the same sheet.

A construction and the operation of a system of the peripheral equipment control device 3 shown in FIG. 1 is described hereinbelow.

The peripheral equipment control device 3 is connected to the reader unit 1 by a cable. The core unit 10 in the peripheral equipment control device 3 controls signals and functions. The peripheral equipment control device 3 have therein: the facsimile unit 4 for executing facsimile transmission/reception; file unit 5 for converting various original image information into electric signals and storing into a memory medium such as a magnetooptical disk or the like; formatter unit 8 for developing code information from the computer to image information; computer interface unit 7 for interfacing with the computer; image memory unit 9 for accumulating information from the reader unit 1 and for temporarily accumulating information from the computer; and core unit 10 for controlling the above-mentioned functions.

[First Process]

Figure 4:
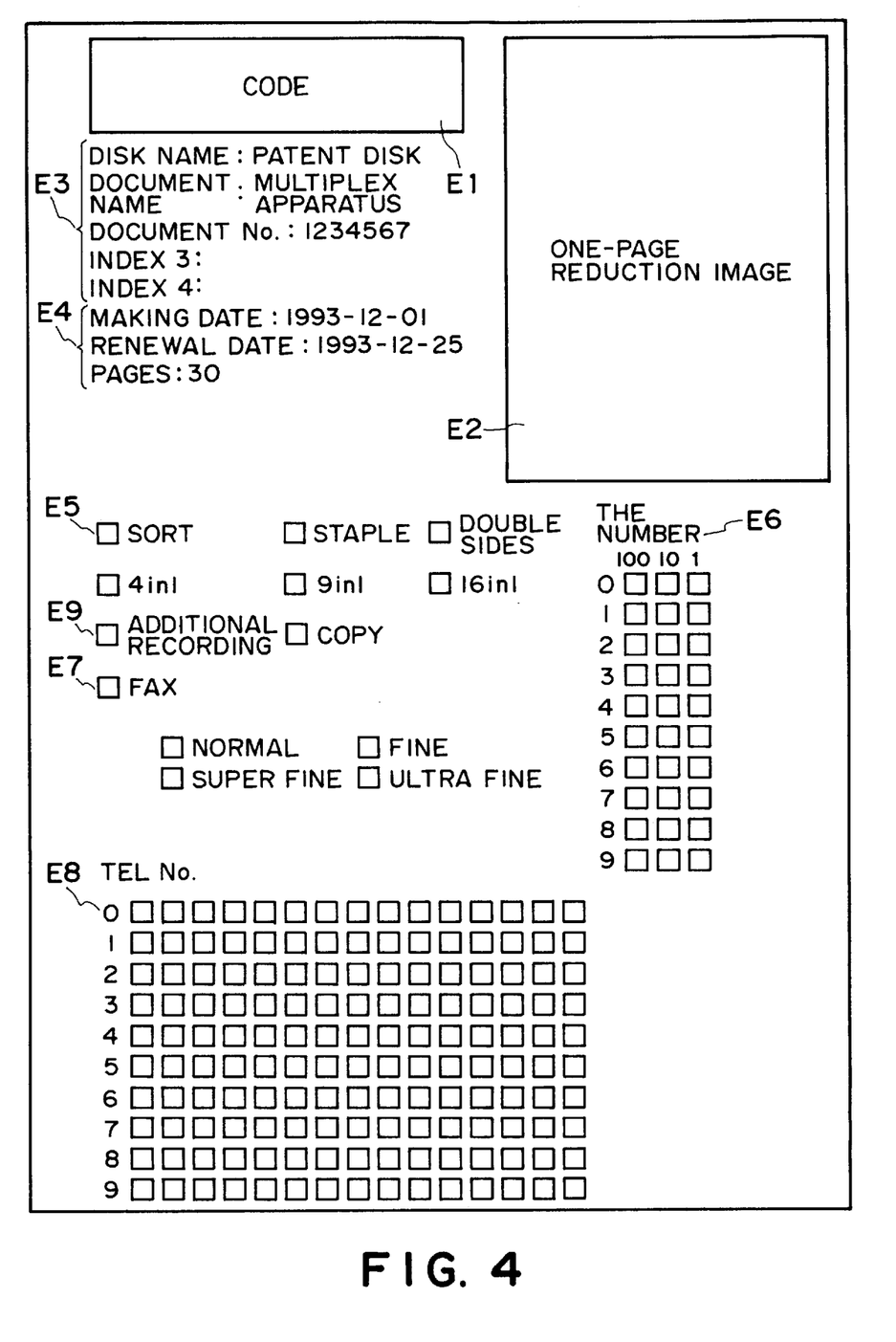
FIG. 4 is a diagram showing an example of a first mark sheet for search and output in the multiplex image forming apparatus according to the invention.

FIG. 4 is a diagram showing an example of a first mark sheet for search and output in the multiplex image forming apparatus according to the invention.

In FIG. 4, reference character E1 denotes a code portion to which code information for image search is added. In the code portion E1, information for identifying the type of the mark sheet, information showing date when the disk in which the image has been stored is formed (formatted), and information for specifying the image stored in the disk are encoded with patterns such as bar codes or the like such that the code can be judged by reading out the code information are added. Combinations of the above code information are controlled so that a plurality of same codes don't exist. That is, all of the files of the image data stored in the disk of the same date are set to different document numbers. Reference character E2 denotes a portion to which a reduction image of one page of the image stored in the disk is added. Reference character E3 indicates a portion in which when the user stores the image in the disk, information received from the console unit 124 is recorded as character information. 'Disk name' is a name of the disk named when the disk is created. 'document name' (index 1), 'document number' (index 2), 'index 3', and 'index 4' are inputted as indices which are used when the user searches by an operation from the console unit 124. When the user does nothing at the time of storing the image, the above items are blank. (In the example of FIG. 4, since nothing is inputted to the indices 3 and 4, they are blank.) Since the document number here and the number of the information for specifying the image included in the code portion E1 are different, even if the user doesn't set the document number, the image can be specified by the information added to the code portion. Reference character E4 denotes a portion to which the information set by the file unit 5 is recorded as character information. 'Making date' is year/month/day when the image has been stored as a file into the disk. 'Renewal date' is year/month/day when the contents of the file are changed (including deletion and addition). 'Pages' denotes the number of pages of the image in the file. Reference character E5 denotes a marking area for instructing printing conditions when the image is printed by the printer unit 2. A plurality of number of image files are printed onto the transfer papers, the transfer papers are sorted by the sorter, the ejected transfer papers are stapled, or the images are printed onto double sides of the transfer paper and the printed double-side transfer paper is ejected out. A process of (n-inch-line) such that images of (n) pages are reduced and transferred and copied onto one transfer paper is also executed. When nothing is marked in E5, the image is transferred and copied onto one side of one transfer paper per image of one page and the transfer paper is ejected. Reference character E6 indicates a marking area for designating the number of image files to be outputted. When nothing is marked in E6, the number of output files is set to one. Reference character E7 denotes a marking area which is marked when the images are facsimile transmitted. A resolution (normal: 200×100 dpi, fine: 200×200 dpi, super fine: 200×400 dpi, ultra fine: 400×400 dpi) at the time of the transmission can be designated. When the resolution is not designated in E7, the image is transmitted at the normal resolution. Reference character E8 denotes a marking area for instructing a partner telephone number in case of facsimile transmission. Reference character E9 denotes a marking area for designating a file processing mode for storing the image into the disk. 'Additional recording' is an area which is marked when an image is additionally stored into the same file as that of the relevant image. 'Copy' is an area which is marked when the file of the image is read out from the disk and is stored into another disk. The functions can be executed by marking the marking areas of E5 to E9 by a pencil or the like. The output mode is determined from the contents of E5 to E9.

Figure 5:
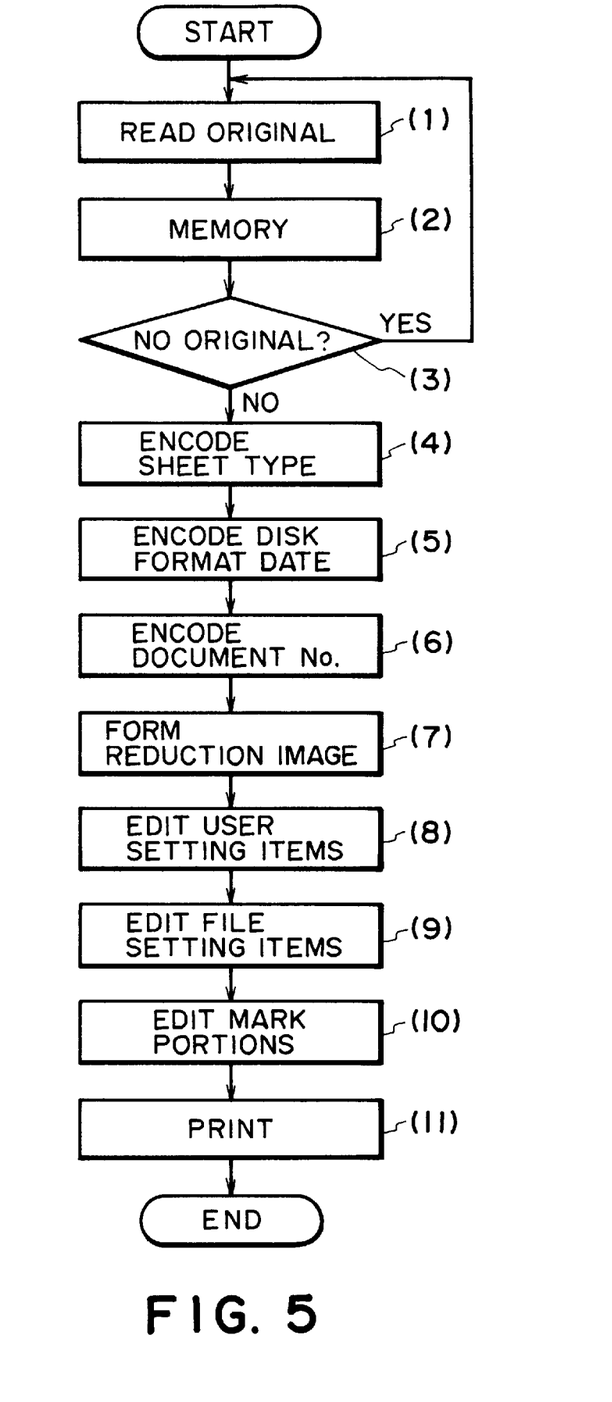
FIG. 5 is a flowchart showing an example of an output processing procedure of the first mark sheet for search and output in the multiplex image forming apparatus according to the invention.

FIG. 5 is a flowchart showing an example of a processing procedure for outputting the first mark sheet for search and output in the multiplex image forming apparatus according to the invention. Reference numerals (1) to (11) show processing steps.

The sheet type of the mark sheet which is outputted here is preliminarily selected by the console unit 124.

First, when originals are put on the document feeder 101 and a start button is depressed, the originals are read out one by one by the reader unit 1 (step 1), image data is sent to the core unit 10 shown in FIG. 1 and is binarized and sent to the file unit 5. In this instance, search conditions such as document name, document number, and the like can be set from the console unit 124 before depressing the start button.

The file unit 5 stores the read image data as a file into the magnetooptical disk set in the external memory device 6. The file unit 5 also stores the items such as document number, document name, and the like which are unique to every document set by the user and the items such as making date and the like set by the file unit 5 in correspondence to the images, respectively (step 2). A check is made to see whether all of the originals put on the document feeder 101 have been read out or not (step 3). Steps (1) to (3) are repeated until no original remains on the document feeder 101. In this case, the originals put on the document feeder 101 are stored as one file.

After reading out all of the originals, the core unit 10 encodes the information indicative of the sheet type (step 4) and edits the information into the code portion E1 shown in FIG. 4 on the image memory unit 9. The core unit 10 also encodes the date when the disk is made (formatted) (step 5) and edits into the code portion E1 in FIG. 4 on the image memory unit 9.

In the embodiment, the information indicative of the sheet type is used for identifying the kind of the mark sheet read out from a plurality of kinds of mark sheets at the time of the searching process.

The unique document number added to the stored document file is encoded (step 6) and is edited into the code portion E1 in FIG. 4 on the image memory unit 9. The image obtained by reducing the image of the first page of the stored document file is formed (step 7) and is edited into the code portion E2 of the reduction image of one page in FIG. 4 on the image memory unit 9.

The items such as document name and the like set by the user by the console unit 124 are edited as character information into the portion E3 of the document name and the like in FIG. 4 on the image: memory unit 9 (step 8). The items such as making date of the disk and the like set by the file unit 5 are edited as character information into the portion E4 of the making date and the like in FIG. 4 on the image memory unit 9 (step 9). The mark portion E5 for instructing the operations such as double sides, sorting, and the like; a portion E6 of a number of files designation; a portion E7 of a facsimile mode designation; a portion E8 of a telephone number designation; and a portion E9 of a file process designation are edited as blank marking areas on the image memory unit 9 (step 10). The sheet of FIG. 4 edited on the image memory unit 9 is printed out (step 11). The recording process is finished in this manner.

With reference to a flowchart shown in FIG. 6, processing operations for image search and output based on the first mark sheet for search and output generated from the printer unit 2 shown in FIG. 1 will now be described.

Figure 6:
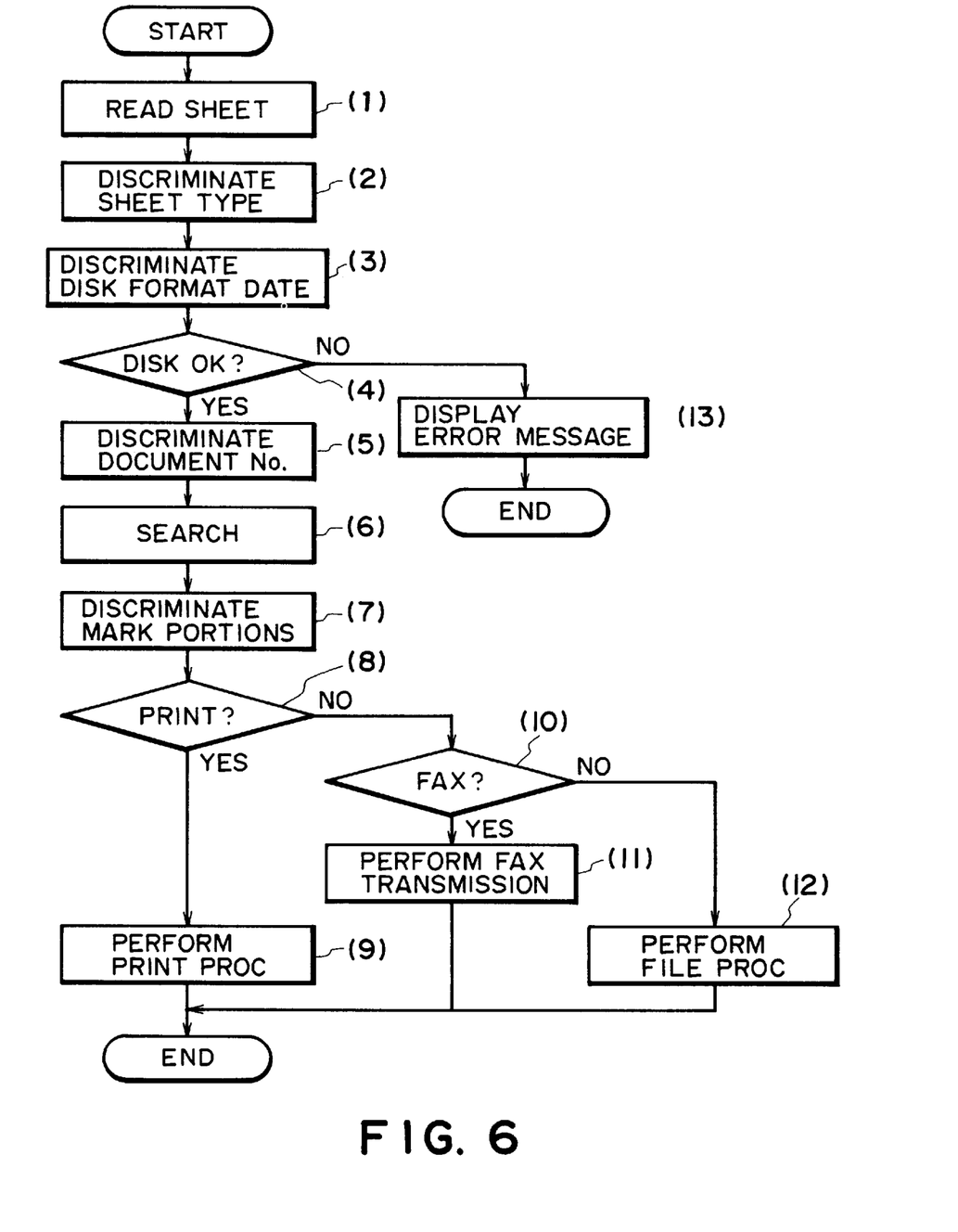
FIGS. 6 to 8 are flowcharts each showing an example of a processing procedure for search and output of an image by reading out the first mark sheet for search and output.

FIG. 6 is a flowchart showing an example of the first processing procedure for image search and output by reading out the first mark sheet for search and output in the multiplex image forming apparatus according to the invention. Reference numerals (1) to (13) denote processing steps.

When the file mode is selected from the console unit 124 and the mark sheet is put on the document feeder 101 and the start button is depressed, the mark sheet is read out by the reader unit 1 (step 1). The read image data is sent to the core unit 10 and binarized and sent to the file unit 5.

The core unit 10 analyzes the code of the sheet type of the code portion E1 and discriminates the sheet type of the read mark sheet (step 2). The core unit 10 also analyzes the code of the disk format date of the code portion E1 and discriminates the disk format date (step 3).

The core unit 10 compares the discriminated disk format date with the disk format date of the disk set in the external memory device 6, thereby judging whether the disk is OK (disk format dates coincide) or not (step 4). If the disk format dates differ, an error message is displayed in step (13) and the processing routine is finished.

On the other hand, if YES in step (4), the core unit 10 further analyzes the code of the document number of the code portion El, discriminates the document number (step 5), and sends a control instruction to search the relevant document to the file unit 5. The file unit 5 searches the document having the discriminated document number (step 6). Subsequently, the mark portions E5 to E9 are analyzed and the operation instructions marked are discriminated (step 7). A check is made to see if the instructed operations relate to the printing conditions such as double sides, sorting, and the like in E5 (step 8). If YES, the relevant printing processes are executed (step 9) and the processing routine is finished.

On the other hand, if NO in step (8), a check is made to see if they are operation instructions regarding the facsimile transmission of E7 and E8 (step 10). If YES, the facsimile transmitting process is executed (step 11) and the processing routine is finished.

On the other hand, when NO in step (10), the filing process by the instruction of E9 is performed (step 12) and the processing routine is finished.

[Second Process]

Figure 7:
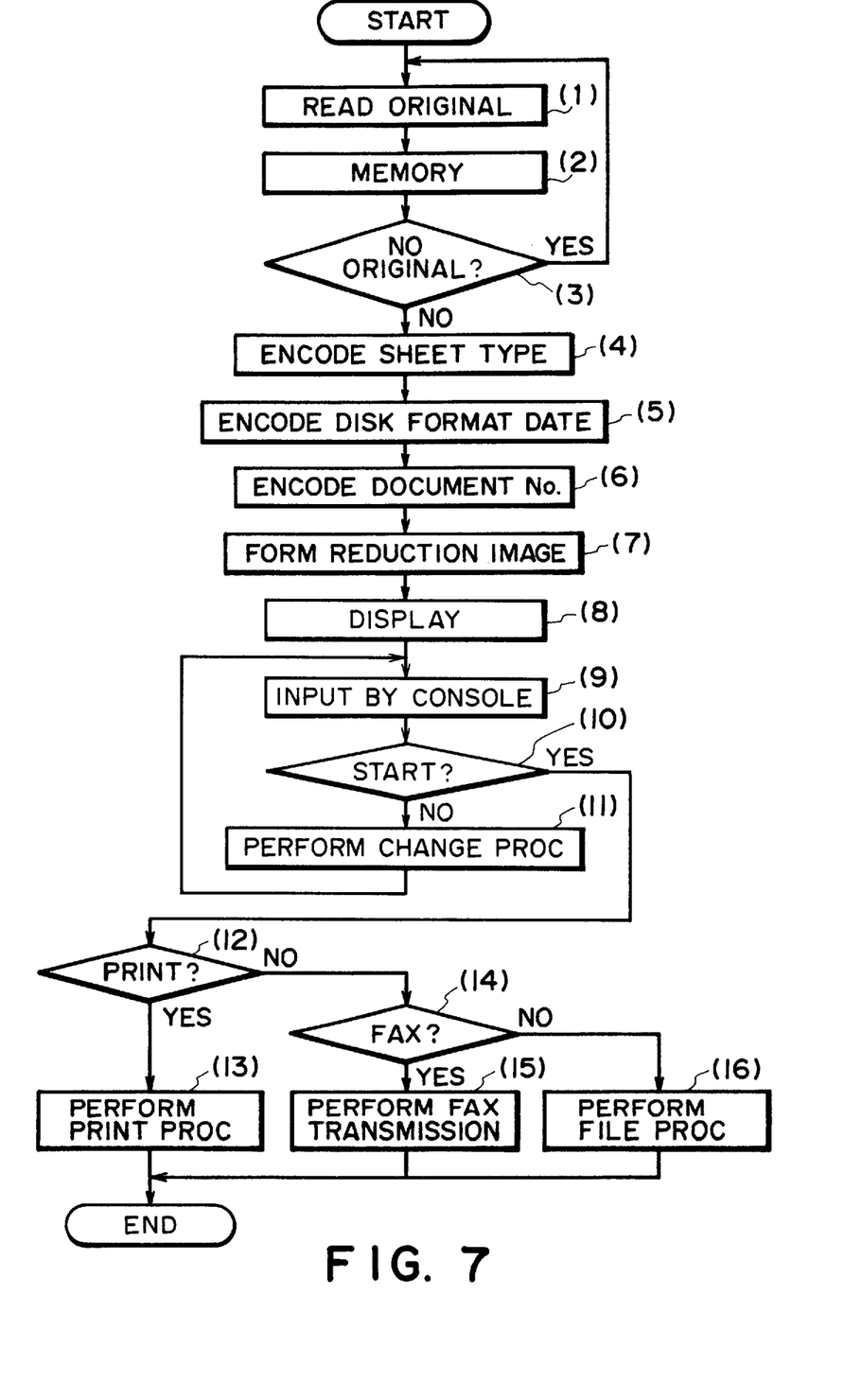

FIG. 7 is a flowchart showing an example of a second processing procedure for image search and output by reading out the first mark sheet for search and output in the multiplex image forming apparatus according to the invention. Reference numerals (1) to (16) show processing steps. Since steps (1) to (7) correspond to similar steps (1) to (7) in FIG. 6, steps (8) to (16) will be described hereinbelow.

After finishing step (7) shown in FIG. 6, the contents of the discriminated operations are displayed on a display provided for the console unit 124 (step 8). The apparatus waits for a depression of the key of the console unit 124 (step 9). When the key is depressed, a check is made to see if the depressed key is the start key (step 10). If NO, a changing process corresponding to the depressed key is executed (step 11). The operation instructed by the sheet shown in FIG. 4 is changed and the processing routine is returned to step (9).

On the other hand, if the start key is judged in step (10), a check is made to see if the operation instructed by the mark sheet relates to the printing conditions such as double sides, sorting, and the like of E5 (step 12). If YES, the relevant printing process is executed (step 13) and the processing routine is finished.

On the other hand, when NO in step (12), a check is made to see if the operation instruction relates to the facsimile transmission of E7 and E8 (step 14). If YES, the facsimile transmitting process is executed (step 15) and the processing routine is finished.

On the other hand, when NO in step (14), the filing process by the instruction of E9 is executed (step 16) and the processing routine is finished.

[Third Process]

Figure 8:
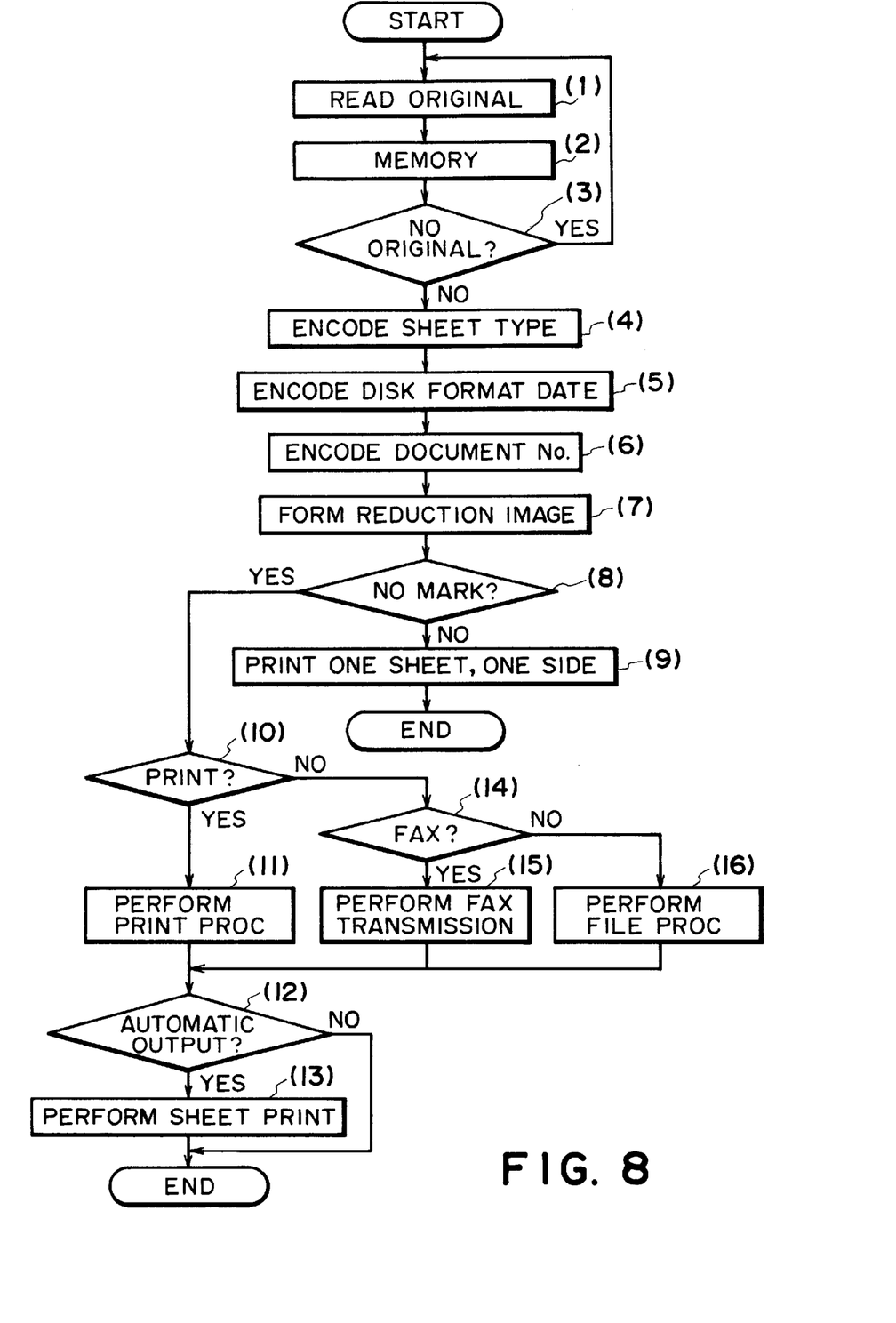

FIG. 8 is a flowchart showing an example of a third processing procedure for image search and output by reading out the first mark sheet for search and output in the multiplex image forming apparatus according to the invention. Reference numerals (1) to (16) show processing steps. Since steps (1) to (7) correspond to similar steps (1) to (7) in FIG. 6, steps (8) to (16) will be described hereinbelow.

After finishing step (7) shown in FIG. 6, a check is made to see whether or not the number of marks in the marking areas of the read mark sheet is equal to '0' from the discrimination result (step 8). When it is equal to '0', one document file specified by the code of the code portion E1 is printed on one side of each sheet (step 9) and the processing routine is finished.

On the other hand, if NO in step (8), a check is made to see if the instructed operation relates to the printing conditions such as double sides, sorting, and the like of E5 (step 10). If YES, the printing process is executed (step 11). A check is made to see whether or not an automatic output of the mark sheet has been set by the console unit 124 (step 12). If NO, the processing routine is finished as is. If YES, processes for printing the mark sheet shown in FIG. 4 are executed in a manner similar to steps (4) to (11) in FIG. 5 (step 13) and the processing routine is finished.

On the other hand, if NO in step (10), a check is made to see if the operation instruction relates to the facsimile transmission (step 14). If YES, the facsimile transmitting process is executed (step 15) and the processing routine is finished.

When NO in step (14), the filing process is executed and the processing routine advances to step (12).

[Fourth Process]

Figure 9:
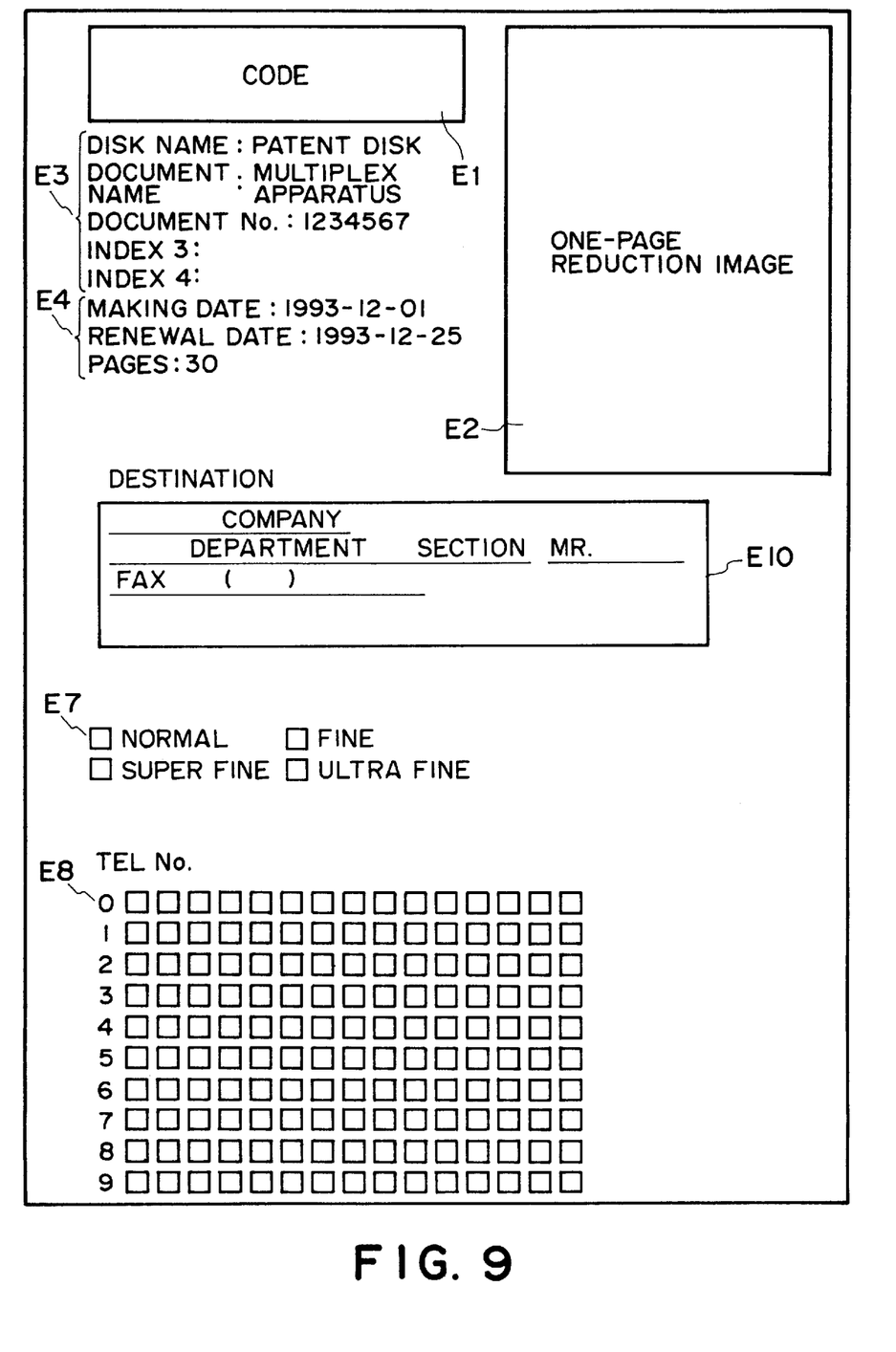
FIG. 9 is a diagram showing an example of a second mark sheet for the search and output in the multiplex image forming apparatus according to the invention.

FIG. 9 is a diagram showing an example of a second mark sheet for search and output in the multiplex image forming apparatus according to the invention and portions similar to those in FIG. 4 are designated by the same reference numerals. FIG. 9 particularly corresponds to a mark sheet for instructing the facsimile transmission.

In the diagram, reference character E10 denotes a portion for designating a destination for the facsimile transmission.

Figure 10:
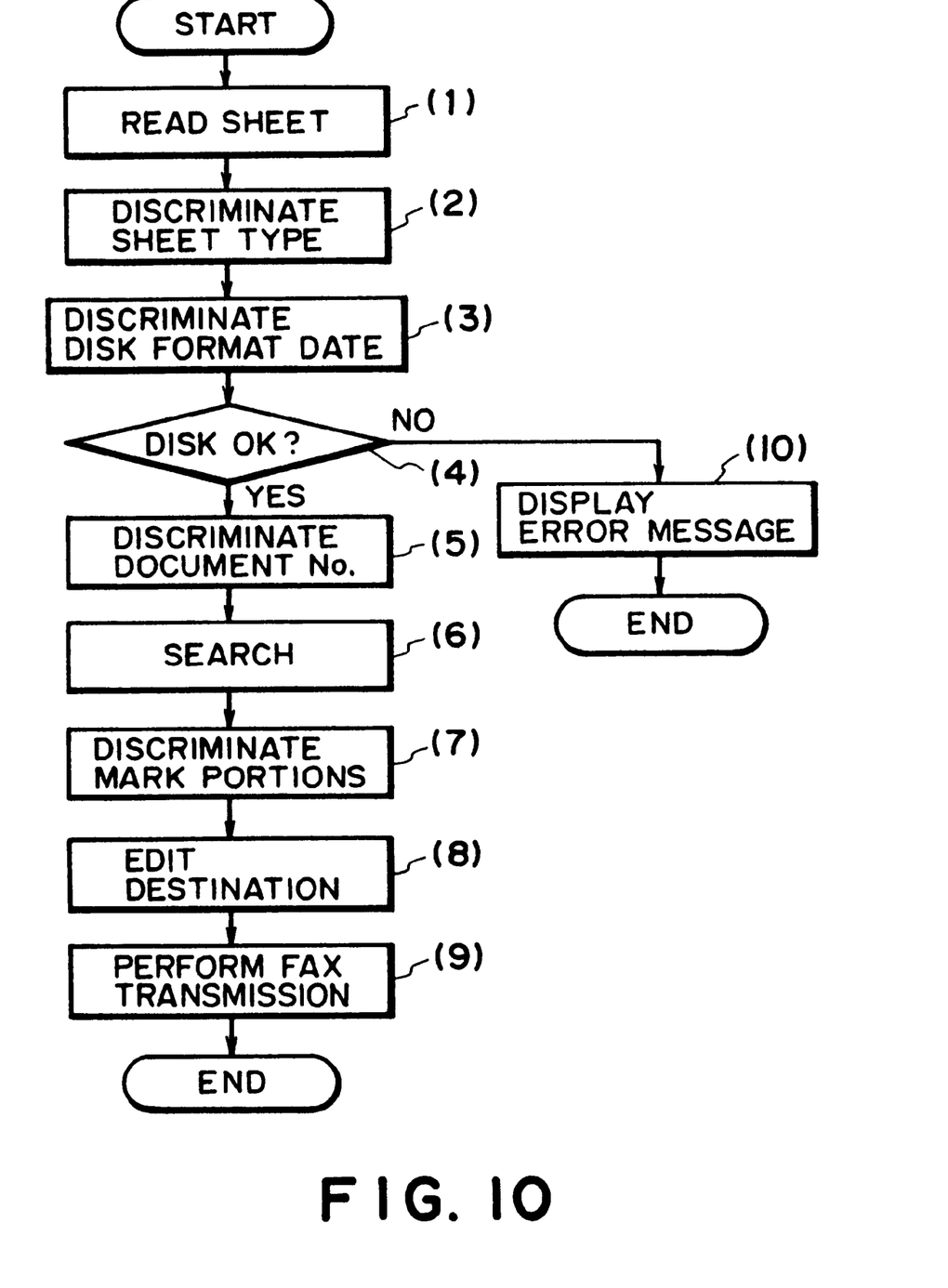
FIG. 10 is a flowchart showing an example of a processing procedure for the search and output of the image by reading out the second mark sheet for search and output.

FIG. 10 is a flowchart showing an example of a fourth processing procedure for image search and output by reading out the second mark sheet for search and output in the multiplex image forming apparatus according to the invention. Reference numerals (1) to (10) show processing steps.

When the mark sheet is outputted, the entry portion E10 for the destination is edited in addition to the edition of the mark portions and the like. Operations when the document file is outputted are executed as follows. When the file mode is selected by the console unit 124 and the mark sheet is put on the document feeder 101 and the start button is depressed, the mark sheet shown in FIG. 9 is read out (step 1). The image data is sent to the core unit 10 and is binarized and sent to the file unit 5. The core unit 10 analyzes the code of the sheet type of the code portion E1 of the read mark sheet and discriminates the sheet type (step 2).

The code of the disk format date of the code portion E1 is analyzed. The disk format date on the sheet, namely, the disk format date of the disk in which the document files have been stored is discriminated (step 3) and is compared with the disk format date of the disk set in the external memory device 6. Whether those disk format dates coincide (disk OK) or not is judged (step 4). When it is judged that the disk format dates are different, an error message is displayed (step 10) and the processing routine is finished.

On the other hand, if YES in step (4), the core unit 10 analyzes the code of the document number of the code portion E1 shown in FIG. 9, discriminates the document number (step 5), and sends a search control instruction to the file unit 5. The file unit 5 searches the document file having the discriminated document number from the disk set in the external memory device 6 (step 6) and finds the document having the discriminated document number.

The mark portions of E7 and E8 shown in FIG. 9 are analyzed and the operation instruction marked is discriminated (step 7). The entry portion E10 for the destination is taken out and synthesized and edited with a stencil paper of the invoice recorded in the disk (step 8), thereby forming the invoice. The formed invoice and the document searched in step (6) are facsimile transmitted (step 9) and the processing routine is finished.

In the case where the apparatus has an OCR function, it is also possible to recognize the destination by characters and to convert it to a code based on the shift JIS code or the like and to form the invoice by a font designated by the user. It is also possible to recognize the facsimile number by characters and to dial same.

As mentioned above, when the image data is stored into the disk, the mark sheet for searching the image is outputted, thereby enabling the stored image data to be easily read out later by using the mark sheet. Since the marking areas for designating the output modes (sorting, staple, double sides, 4-inch-line, 9-inch-line, 16-inch-line, facsimile) are provided for the mark sheet, the image data can be outputted in the mode marked in the marking areas. The actual search and output can be executed by a simple operation such that the mark sheet is read out by the reader, or the like.

Since the code information (E1) for specifying the image data, the character information (E3, E4) regarding the image data, and the reduction image (E2) of the first page of the image data are displayed on the mark sheet, the contents of the file can be easily judged.

By constructing the apparatus in a manner such that the operation contents by the contents marked in E5 to E8 in the mark sheet are discriminated and the discriminated contents are displayed on the display unit provided for the console unit 124 and can be changed by a manual operation by the operator, even when there is an erroneous marking or an erroneous reading of the mark, it can be corrected. When there is no mark in the marking areas, by outputting the image data in a default mode, the image data of a desired file can be obtained without marking.

After the search and output by the mark sheet are finished, by again outputting the mark sheet, a new mark sheet can be obtained after the mark sheet is used.

In case of facsimile transmitting the stored image data, the destination (E10) written in the mark sheet is taken out and can be transmitted as an invoice. Although the invention has been described on the basis of the preferred embodiments, the present invention is not limited to the foregoing embodiments and many modifications and variations are possible within the spirit and scope of the appended claims of the invention.

What is claimed is:

1. An image processing apparatus comprising:

input means for inputting image data;

setting means for selectively setting a detachable memory medium;

memory means for storing the image data inputted by said input means into the detachable memory medium set by said setting means;

output means for outputting a sheet for searching the image data stored in the memory medium;

searching means for searching the image data stored in the memory medium, by inputting with said input means the image data based on the sheet outputted by said output means; and transmitting means for transmitting the image data searched by said searching means, wherein said output means outputs the sheet to which information for specifying the image data stored in the memory medium, information for specifying the individual memory medium which is set by said setting means and in which the image data to be searched by said searching means is stored, and a marking area for designating a destination when the image data is transmitted by said transmitting means, are added.

2. An apparatus according to claim 1, wherein said memory means stores image data of a plurality of pages as one file into said memory medium, and said output means outputs the sheet to which the information for specifying said file and a marking area for designating a telephone number of said destination are added.

3. An apparatus according to claim 1, further comprising:

reading means for reading the image on the sheet outputted by said output means and generating image data based on the read image, wherein said searching means searches the image data stored in said memory medium by inputting with said input means the image data which has been generated by said reading means and includes the information added to the sheet.

4. An apparatus according to claim 3, further comprising transmitting means for transmitting the image data searched by said searching means, wherein by reading out a mark written in said marking area by said reading means, said transmitting means transmit the image data to the designated destination.

5. An apparatus according to claim 1, wherein the image data based on the sheet which is transmitted by said transmitting means represents the destination.

6. An apparatus according to claim 5, further comprising formation means for forming an invoice on the basis of the image data representing the destination included in the sheet, and wherein said transmitting means transmits the invoice formed by said formation means, prior to transmitting the image data searched by said searching means.

7. An apparatus according to claim 1, wherein said transmitting means further transmit at least a part of the image data based on an image on the sheet.

8. An apparatus according to claim 1, further comprising information means for informing, if the one memory medium from which the image data is searched by said searching means is inappropriate, that the one memory medium is inappropriate.

9. An image processing apparatus comprising:

input means for inputting image data;

setting means for selectively setting a detachable memory medium;

memory means for storing the image data inputted by said input means into the detachable memory medium set by said setting means; and output means for outputting a sheet for searching the image data stored in the memory medium;

wherein said output means outputs the sheet for searching the image data in accordance with the completion of the storage of the image data inputted by said input means into the memory medium; and said output means outputs the sheet to which information for specifying the image data stored in the memory medium, information for specifying the individual memory medium which is set by said setting means and which stores the image data, and a reduction image of the image data to be specified, are added.

10. An apparatus according to claim 9, wherein said memory means stores image data of a plurality of pages as one file into said memory medium, and said output means outputs one sheet for searching the file constructed by said image data of said plurality of pages.

11. An apparatus according to claim 9, further comprising:

reading means for reading out the sheet outputted by said output means; and searching means for searching the image data stored in said memory medium by reading out the information for specifying the image data added to the sheet by said reading means.

12. An image processing apparatus comprising:

input means for inputting image data;

memory means for storing the image data inputted by said input means into the memory medium;

printing means for printing an image based on the image data stored in the memory medium and a sheet image for searching the image data; and transmitting means for transmitting the image data stored in the memory medium, wherein said printing means prints the sheet image to which information for specifying the image data stored in the memory medium and a marking area for designating at least one from among a plurality of output modes for outputting the image data specified by said information by said printing means and said transmitting means are added in one page.

13. An apparatus according to claim 12, wherein said memory means stored image data of a plurality of pages as one file into said memory medium; and said printing means prints the sheet image to which information for specifying said file and the marking area for designating the output mode in case of outputting the image data of said file are added.

14. An apparatus according to claim 12, wherein said printing means further print the sheet image to which a reduction image of the image data specified by said information is further added.

15. An apparatus according to claim 14, further comprising:

reading means for reading the sheet image printed by said printing means; and searching means for searching the image data stored in said memory medium by reading the information added to the sheet by said reading means.

16. An apparatus according to claim 15, wherein said printing means prints the image data in an output mode discriminated by reading the mark written in said marking area by said reading means.

17. An apparatus according to claim 16, wherein said output mode is a mode for printing the image data searched by said searching means onto double sides of a recording paper by said printing means.

18. An apparatus according to claim 16, wherein said output mode is a mode for stapling and outputting recording papers on which the image data searched by said searching means is printed by said printing means.

19. An apparatus according to claim 16, wherein when there is no mark in the marking area for designating said output mode, said printing means prints the image based on the image data searched by said searching means in a predetermined output mode.

20. A method of forming a sheet for searching image data stored in one of a plurality of detachable memory mediums, comprising the steps of:

(a) storing output image data into the one memory medium;

(b) generating information for specifying the image data stored in step (a);

(c) generating information for specifying the individual memory medium into which the image data is stored in step (a);

(d) generating a reduction image of the image data stored in step (a); and (e) outputting a sheet to which the information generated in steps (b) and (c) and the reduction image generated in step (d) are added by a printer.

21. A method according to claim 20, wherein in step (a), image data of a plurality of pages is stored as one file into said memory medium.

22. A data processing method comprising:

a setting step of selectively setting a detachable memory medium;

an outputting step of outputting image data of a sheet for searching data from the detachable memory medium loaded to a data processing apparatus, as set by said setting step;

an inputting step of inputting the image data of the sheet;

a searching step of searching the data to be searched from the memory medium in accordance with inputting of the image data of the sheet in said inputting step; and a transmitting step of transmitting the data searched in said searching step, wherein said outputting step outputs the sheet to which the image data with information for specifying the data stored in the individual memory medium, information for specifying the memory medium which is set by said setting step and in which the image data to be searched by said searching step is stored, and a marking area for designating a destination when the data to be searched in said searching step is transmitted in said transmitting step, are added.

23. A data processing method comprising:

an inputting step of inputting data;

a storing step of storing in a memory medium the data inputted in said inputting step;

a printing step of printing an image based on image data of a sheet for searching the data from the memory medium; and a transmitting step of transmitting the image data stored in the memory medium in said storing step, wherein said printing step prints the image data for specifying the data stored in the memory medium with information for designating, from among a plurality of output modes, at least one output mode used in case of outputting the specified data by said printing step and said transmitting step added in a single page, and the plurality of output modes contain at least a mode for transmitting the image data stored in the memory medium and a mode for printing such data.

24. A computer readable program stored in a storage medium, said program controlling a data processing apparatus to perform a method comprising the steps of:

(a) selectively setting a detachable memory medium;

(b) outputting image data of a sheet for searching data from the detachable memory medium loaded to a data processing apparatus as selectively set;

(c) inputting the image data of the sheet;

(d) searching the data to be searched from the memory medium in accordance with the image data of the sheet inputted in said step (c); and (e) transmitting the data searched in said step (d), wherein in said step (b), to output the image data with information for specifying the data stored in the memory medium which is selectively set and in which the image data to be searched in said searching step is stored, information for specifying the memory medium and a marking area for designating a destination when the data to be searched in said step (d) is transmitted in said transmitting step, are added.

25. A computer readable program stored in a storage medium, said program controlling a processor-controlled apparatus to perform a method comprising the steps of:

(a) storing image data in one of a plurality of detachable memory mediums;

(b) generating information for specifying the image data stored in the one memory medium in said step (a);

(c) generating information for specifying the individual memory medium to which the image data is stored in said step (a);

(d) generating information representing a reduction image of the image data stored in the one memory medium in said step (a); and (e) outputting image information representing a sheet for searching the image data stored in the one memory medium, wherein the information generated in said steps (b), (c) and (d) are added to the image information.

26. A computer readable program stored in a storage medium, said program controlling a processor-controlled apparatus to perform a method comprising the steps of:

(a) storing data in a memory medium;

(b) generating information for specifying the data stored in the memory medium;

(c) transmitting the data stored in the memory medium;

(d) generating information for designating from among a plurality of output modes used in case of outputting the specified data, wherein the plurality of output modes contain at least a mode for transmitting the data stored in the memory medium and a mode for printing such data; and (e) printing image information representing a sheet for searching the data stored in the memory medium, wherein the information generated in said steps (b) and (d) are added to the image information.

* * * * *

UNITED STATES PATENT AND TRADEMARK OFFICE
CERTIFICATE OF CORRECTION

PATENT NO.   : 5,982,502
DATED        : November 9, 1999
INVENTOR(S)  : SHIGERU JINNAI It is certified that error appears in the above-identified patent and that said Letters Patent is hereby corrected as shown below:

COLUMN 4:

Line 59, "have" should read --has--.

COLUMN 5:

Line 50, "ejected out." should read --ejected.--.

COLUMN 10:

Line 49, "transmit" should read --transmits--; and
    Line 61, "transmit" should read --transmits--.

COLUMN 14:

Line 14, "are" should read --is--.

Signed and Sealed this

Thirteenth Day of March, 2001

Attest:

NICHOLAS P. GODICI

Attesting Officer    Acting Director of the United States Patent and Trademark Office